March 8, 1932.   R. H. UPSON   1,848,809
AIRPLANE
Original Filed Dec. 10, 1928   5 Sheets-Sheet 1

INVENTOR
RALPH H. UPSON.
BY
Harness, Dickey & Pierce
ATTORNEYS

March 8, 1932. R. H. UPSON 1,848,809
AIRPLANE
Original Filed Dec. 10, 1928   5 Sheets-Sheet 2
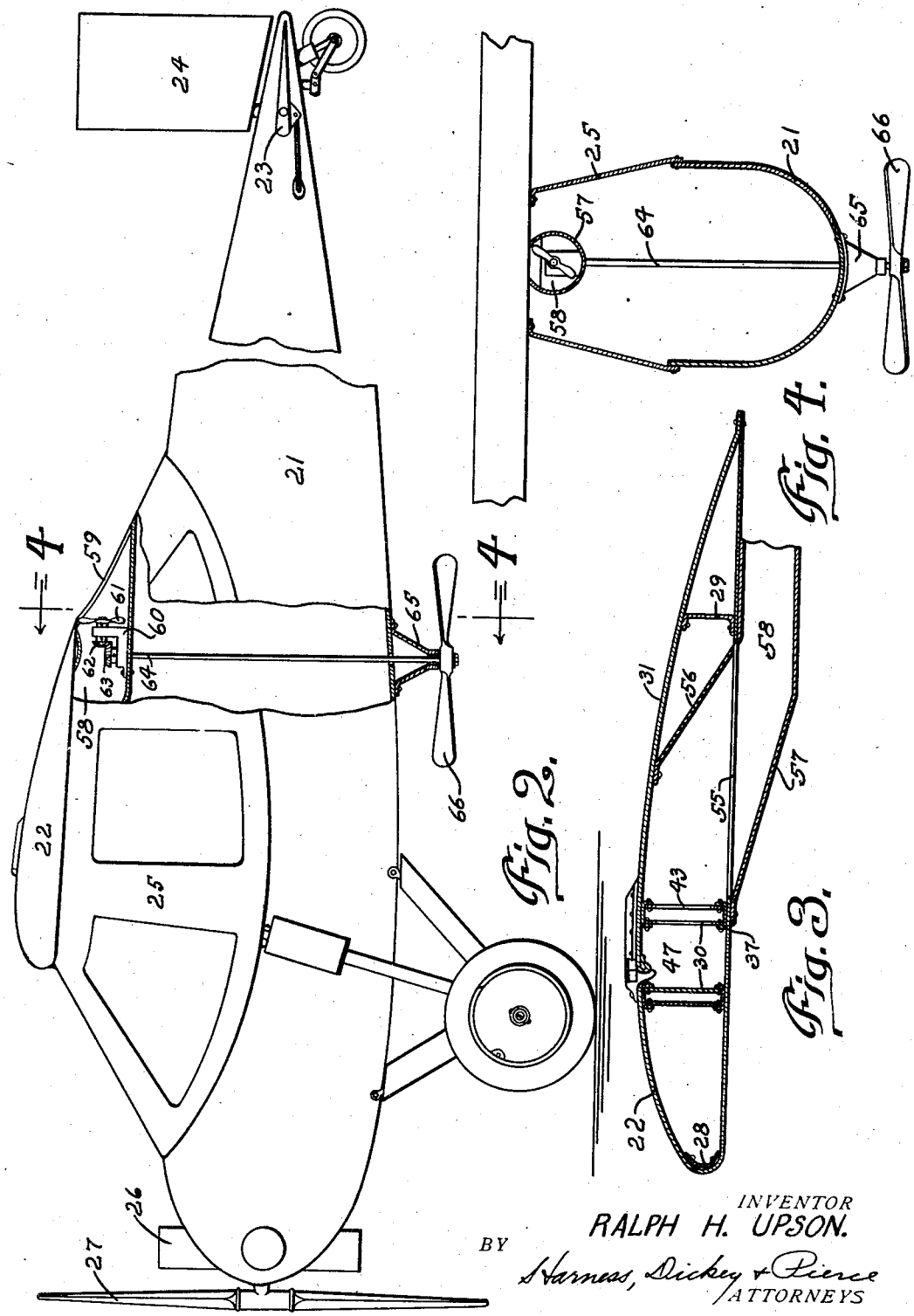
INVENTOR
RALPH H. UPSON.
BY Harness, Dickey & Pierce
ATTORNEYS

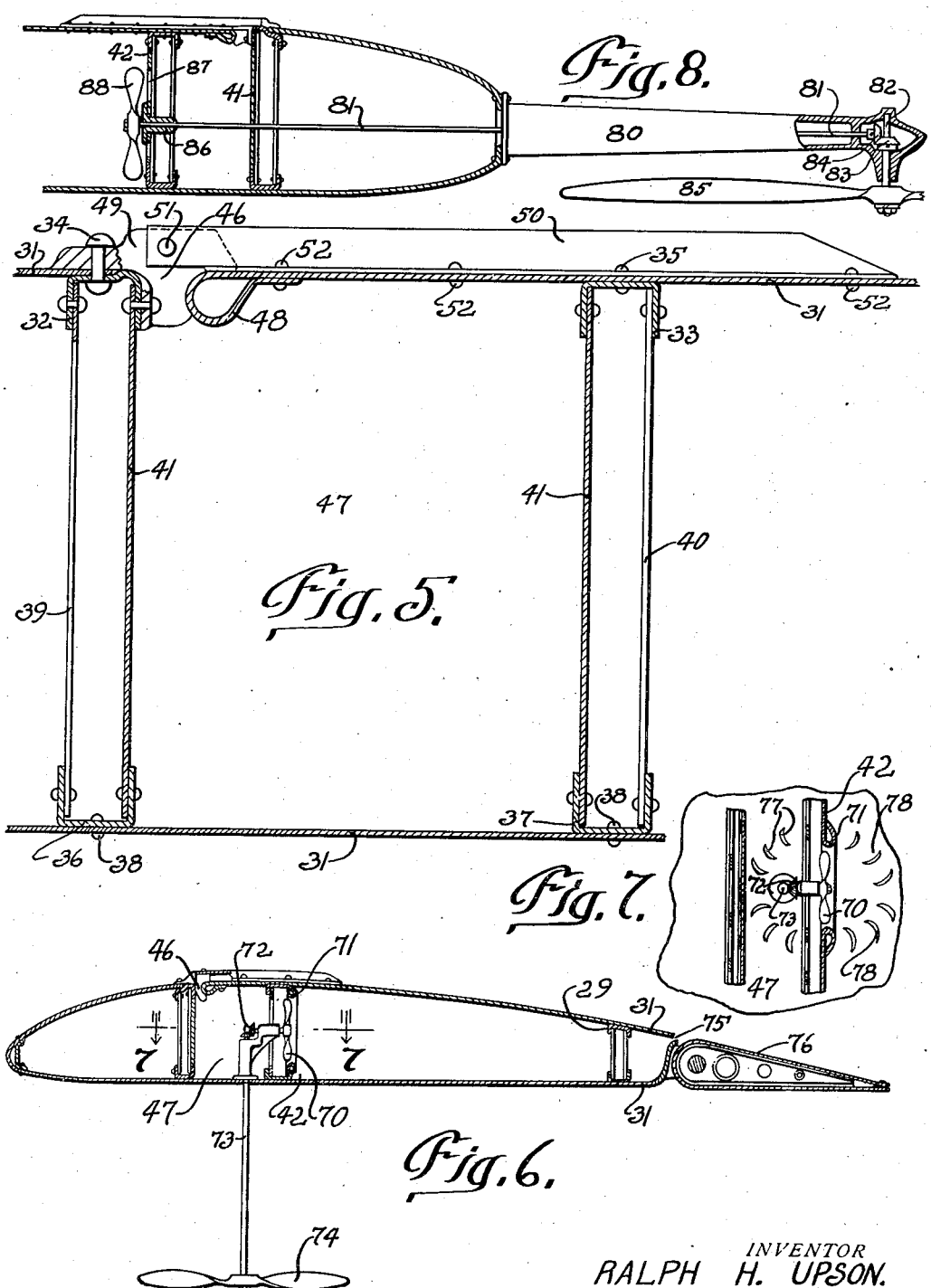

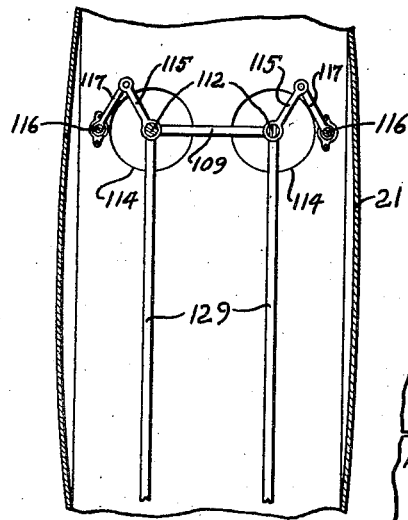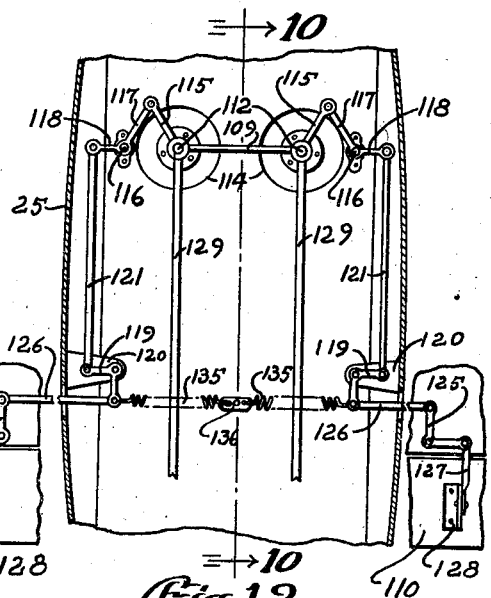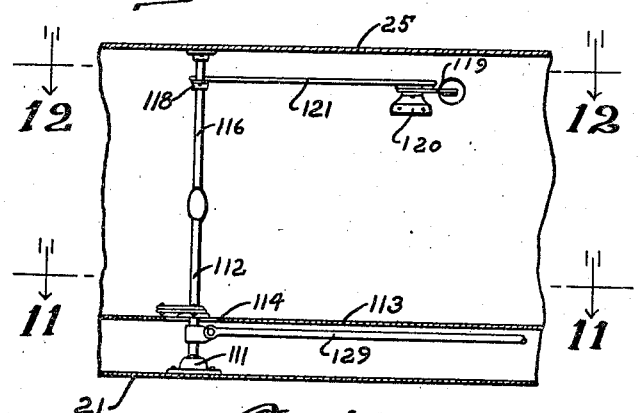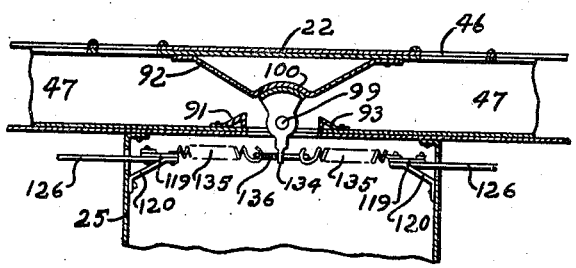

March 8, 1932.  R. H. UPSON  1,848,809
AIRPLANE
Original Filed Dec. 10, 1928  5 Sheets-Sheet 5
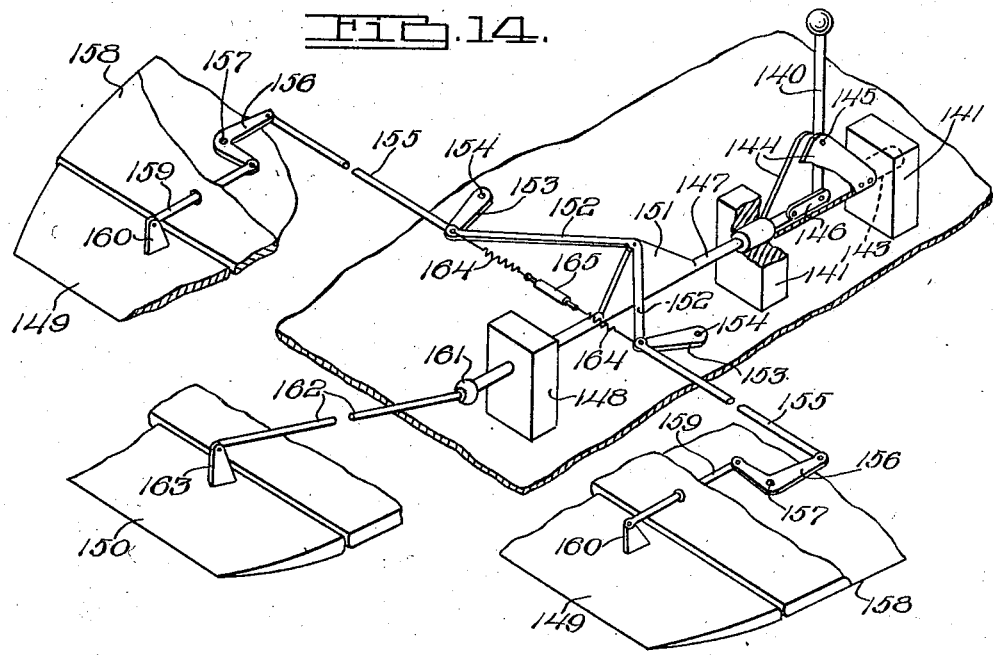
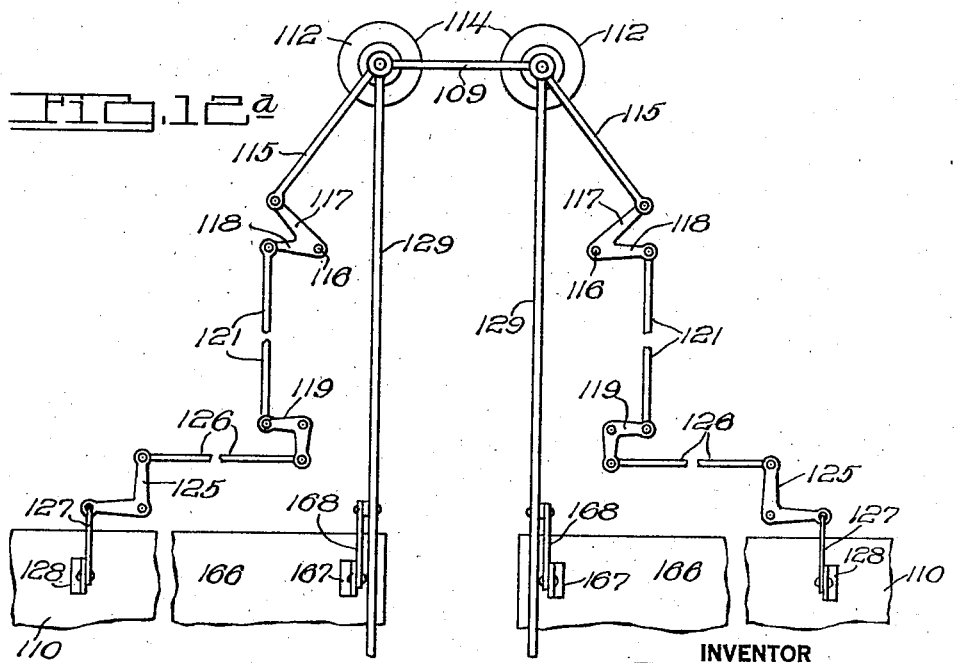
INVENTOR
Ralph H. Upson
BY
Harness, Dickey & Pierce
ATTORNEYS Patented Mar. 8, 1932

1,848,809

UNITED STATES PATENT OFFICE

RALPH H. UPSON, OF RED BANK, NEW JERSEY

AIRPLANE

Refile for abandoned application Serial No. 324,814, filed December 10, 1928. This application filed February 28, 1930. Serial No. 432,244.

This invention relates to airplanes, and has for its principal object the provision of automatic means for eliminating eddies of air over the wings when the airplane is climbing at a relatively steep angle, and particularly when such angle becomes so great in relation to the speed of the plane as to endanger the plane going into a stall.

Another object is to provide automatically operated means for drawing air from the upper surface of an airplane wing during those phases of flight in which air eddies are present or liable to become present above such wings, such means being relatively inoperative during normal horizontal flight.

Another object is to provide an airplane having wings slotted or otherwise perforated lengthwise thereof along their upper surfaces, automatically actuated means being provided for drawing air through such slots and discharging it at a point where it will not improperly affect the flight of the airplane.

Another object is to provide an airplane in which the wings thereof are provided with a slot in the upper surface thereof extending lengthwise of the wings, the slot leading into a passageway within the wings, and air displacing means being provided in conjunction with the passageway for exhausting air therefrom, whereby during operation of such exhausting means air will be drawn through the slots.

Another object is to provide an airplane provided with a wing having a slot in its upper surface extending lengthwise of the wing, a passageway being formed within the wing in communication with the slot, and air exhausting means being provided for exhausting air from the passageway, such air exhausting means being driven by means of a propeller or fan element, driven by a windmill whose axis is positioned perpendicularly, or nearly so, with respect to the general plane of the wing.

Another object is to provide, in combination with a construction as above described, means whereby when one wing is too low relative to the other, such as occurs in improper banking, the air exhausting means will draw air through the slot in the wing or wings on the low side of the airplane only.

Another object is to provide a control for airplanes in which a control member is provided which, when moved to control the ascent or descent of the airplane, will cause the ailerons or flaps to move simultaneously in the same direction and the elevators to move in the opposite direction, and when turned to cause the airplane to turn in a horizontal plane, will cause the ailerons to move in opposite directions.

A further object is to provide, in combination with the construction as above described, a valve member controlled from the "stick" or other control member to limit the air exhausting means to drawing air through the slot in the wing or wings on one side which it is desired to raise for any reason.

The above being among the objects of the present invention, the same consists in certain features of construction and combinations of parts to be hereinafter described with reference to the accompanying drawings, and then claimed, having the above and other objects in view.

In the accompanying drawings which illustrate suitable embodiments of the present invention, and in which like numerals refer to like parts throughout the several different views,—

Fig. 2 is a more or less diagrammatic side elevation of the airplane shown in Fig. 1, certain parts thereof being broken away to better illustrate the present invention.

Fig. 3 is an enlarged vertical sectional view taken transversely through one of the wings of the airplane shown in Figs. 1 and 2.

Fig. 4 is a sectional view taken on the line 3—3 of Fig. 2.

Fig. 5 is an enlarged fragmentary sectional view taken transversely of the length of the wings shown in Figs. 1 and 2, showing the construction of the central portion thereof including the air passageway and wing slot.

Fig. 6 is a vertical sectional view taken transversely to the length of a wing showing a modified construction.

Fig. 7 is an alternative and more or less diagrammatic sectional view taken on the line 7—7 of Fig. 6.

Fig. 8 is a fragmentary vertical sectional view taken transversely to the length of an airplane wing showing another modified form of the present invention.

Fig. 10 is a vertically sectional view taken axially through the fuselage of the airplane shown in Figs. 1 and 2 showing the arrangement of the control members therein.

Fig. 11 is a plan view taken as on the line 11—11 of Fig. 10.

Fig. 12 is a view taken as on the line 12—12 of Fig. 10, and also showing the connections running to the ailerons.

Figure 1:
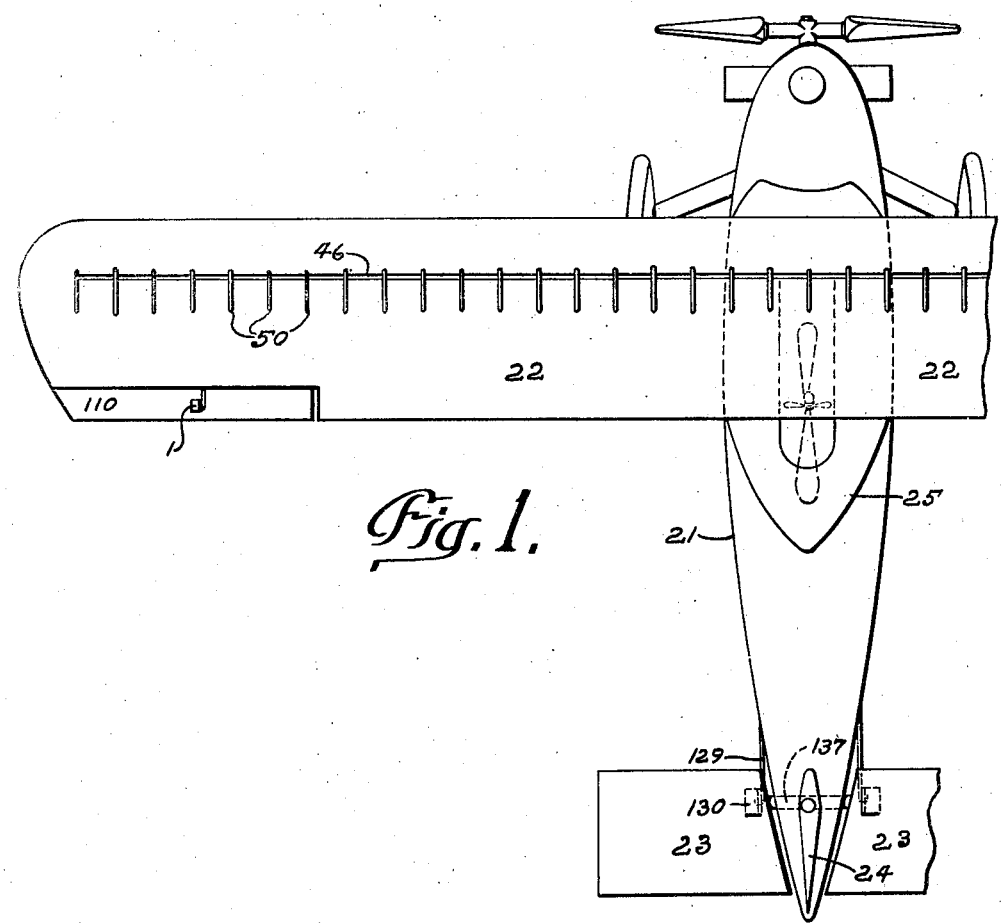
Fig. 1 is a more or less diagrammatic fragmentary plan view of an airplane.

Fig. 12—A is a modification of the construction shown in Fig. 12.

Fig. 13 is a vertical sectional view taken lengthwise of a wing equipped with the controls shown in Fig. 12, and further provided with valve means operated thereby for limiting the effect of the air exhausting means to the wing which it is desired to raise.

Fig. 14 is a more or less diagrammatic perspective view of a modified form of control for the movable wing surfaces and elevators.

It is well known in the airplane art that with excessive inclination of the wings, which occurs particularly with decreasing speeds, air eddies become present on the top surface of the wings which cause the lifting ability of the wings to greatly drop off and tend to throw the plane into a stall. Considerable work has been done in recent years in an effort to eliminate the presence of such eddies, one of the most common remedies being the provision of so-called "wing slots" which transfer air from a point in the lower surface and usually adjacent the leading edge of the wing, to the upper surface of the wing in the neighborhood of the points where such eddies occur so as to prevent a break in the smooth flow of the air over the upper surface.

It has also been shown by laboratory tests that the same purpose may be served by sucking in air from the so-called boundary layer adjacent the upper surface of the wing, the suction being applied thru the medium of a power driven suction blower.

In accordance with the present invention, I eliminate these eddies by application of the latter principle, but in an entirely different manner than has been heretofore proposed, my method being essentially to suck air from the upper surface of the wings at points thereon where eddies are liable to occur, and at such times as eddies are liable to make their appearance, that is, when the wings approach their angle of stall, the necessary power being derived from the motion of the airplane itself thru the air. Specifically, my method consists of forming in the upper surface of the wing and in the neighborhood of the area over which the eddies are liable to appear one or more openings, which may take various forms, and which are connected by suitable ducts or passageways to an exhausting mechanism such as any suitable type of fan mechanism which, when operated, will draw air through the openings in the upper surface and exhaust it at a point which will either not injuriously affect the flight of the airplane or which, in fact, will aid its flight. The means I preferably employ for driving such fan mechanism comprises a windmill propeller or fan of like type so positioned that during normal horizontal flight the air forces acting upon it are not of material values in causing much torque or rotation thereof, but when the angle of inclination of the plane is increased over that of normal horizontal flight, the change in the direction of the air forces acting on the windmill is sufficient to impart material driving force to the same, whereby the exhausting mechanism will be operated to draw sufficient air from the upper surface of the wing to eliminate the formation of eddies over the wings.

Referring to the accompanying drawings I show in Figs. 1 and 2 an airplane having a fuselage 21 provided with wings 22, elevators 23, rudder 24, cabin 25, engine 26 and driving propeller 27. The wings 22 may be of any desirable construction modified in accordance with the present invention, that shown in Fig. 3 comprising a wing of the all metal type having a lengthwise extending nose piece 28, a supplementary spar 29 and a pair of spaced main spar members 30, the whole being united by a sheet metal skin or covering 31 as shown.

The main spar members, as best shown in Fig. 5, comprise the upper channel members 32 and 33 which are secured to the upper skin 31 by rivets such as 34 and 35 respectively, and the lower channel members 36 and 37 which are secured to the lower covering 31 by means of rivets such as 38 in vertical alignment with the upper channels 32 and 33 respectively. The channel 32 is connected to the channel 36 by a suitable web or lattice work 39, and the upper channel 33 is connected to the lower channel 37 by similar lattice work 40. Secured between the channels 32 and 36 is a relatively thin plate 41 which seals the space between the channels in a substantially air tight manner. A similar plate 42 is secured between the channels 33 and 37. As indicated in Fig. 3 immediately over the fuselage 21 the rear plate 42 is cut out as at 43 to provide an opening therein. Elements 39 and 41 may be combined into a single web if desired, as may also the elements 40 and 42.

Referring to Fig. 1 it will be noted that the wings 22 are provided along their upper surface and lengthwise thereof with a slot 46 which leads into the space 47 between the plates 41 and 42 and between the upper and lower skin covers 31. Referring to Fig. 5 which shows an enlarged section through that portion of the wing including the space 47 and the slot 46, the manner of forming the slot 46 and the method of supporting the covering 31 adjacent the slot 46 is shown in detail. It will be observed that the skin covering 31 terminates at the forward edge of the slot 46 at the channel member 32 so that the rear edge of the channel 32, in reality, forms the forward edge of the slot 46. The covering 31 at the rear edge of the slot is bent downwardly and back of itself as at 48 so as to eliminate any sharp corners which air passing through the slot 46 into the space 47 would otherwise come in contact with, thus providing a smooth path for the air entering the space or duct 47. In order to support the covering 31 at the rear edge of the slot 46 a plurality of spaced cast members 49, streamlined in an inward direction, are secured to the channel 32 by the rivets 34 and extend rearwardly therefrom to the rear edge of the slot 46. A pressed metal member 50 extends from a point rearwardly of the rear channel 33 to each member 49 and is secured thereto by means of rivets such as 51 or other suitable means, and is secured to the upper covering 31 by rivets such as 52, as well as to the channel 33 by the rivets 35. The respective members 49 and 50, positioned at spaced intervals along the length of the slot 46 as indicated in Fig. 1, thus bridge the members 32 and 33 and act to support the wing covering between such members without materially restricting the passage of air through the slot 46.

Referring now to Figs. 2 and 3 it will be noted that the lower surface of the wing 22 over the fuselage and between the lower channel 37 and the supplementary spar 29 is cut away as at 55. A sheet metal member 56 is provided within the wing between the upper and lower surfaces thereof so as to form a duct connecting the openings 43 and 55. Another sheet metal member 57 of substantially U-shape, as indicated in Fig. 4, is then secured to the lower surface of the wing so as to form a duct 58 connecting with the opening 55 and extending rearwardly to the rear wall of the cabin 25 where it opens into the air as at 59 in Fig. 2. A free passage for air is therefore provided between the slot 46 in the upper surface of the wing and the point of discharge 59 of the duct 58 at the rear of the cabin 25. Supported by a suitable bracket such as 60 within the duct 58 and adjacent the open end 59 thereof is a fan 6. The forward end of the fan shaft is provided with a bevel gear 62 which is rotatable therewith, and the bevel gear 62 lies in mesh with another bevel gear 63 which is secured to a vertically extending shaft 64 bearing at its upper end in the bracket 60. The shaft 64 projects down through the fuselage 21 and is rotatably supported at its lower end below the fuselage in a suitable bracket 65, and below the bracket 65 is provided with a windmill propeller 66 secured thereto and positioned to rotate in a plane substantially parallel with the general plane of the wings 22.

It will be apparent from the foregoing that during normal horizontal flight of the airplane the relative flow of air toward the windmill 66 will be substantially the plane of rotation thereof and consequently such flow of air will not tend to impart much rotation to the propeller 66. However, it will be apparent that when the speed of the plane is small, at which time the angle of incidence of the wings will be large and at which time the relative flow of air toward the wings 22 will be at an appreciable angle with respect to the general plane of the wings 22, the relative direction of flow of the air with respect to the windmill 66 will change so that there will be a considerable component of such air flow axially of the windmill 66. When this occurs it will be apparent that such axial component will cause the windmill 66 to rotate and in rotating will act through the shaft 64 and gears 63 and 62 to rotate the fan 61. The fan 61 in rotating will force air rearwardly out of the duct 58, and this action of the fan 61 will act to suck air into the space 47 from the upper surface of the wings 22 through the slot 46. It will also be observed that the greater the angle of incidence of the wings 22 the greater rotating force will be applied to the windmill 66 and a corresponding greater flow of air through the slot 46 from the upper surface of the wings will take place. By setting the axis of the windmill at the proper angle, it is thus apparent that the greatest flow of air through the slot 46 from the upper surface of the wings 22 can be made to occur when the plane is about to go into a stall, in spite of the lower speed of the plane under such conditions. This is the result which it is desired to achieve by the present construction for the following reasons. When the angle of incidence of the wings becomes so great in relation to the speed of the airplane as to endanger the plane going into a stall, the air eddies appear over the upper surface of the wing which break the continuity of the flow of air over the upper surface and cause a material drop in the lifting power of the wings. By eliminating the formation of such eddies and thereby insuring the continuity of the flow of air over the upper surface of the wing the lifting power of the wing is maintained, which permits the plane to be operated with a much greater angle of incidence of the wings and thereby permits a much lower landing speed to be utilized as well as a much faster climb to be realized. The slot or slots 46 are preferably placed along those portions of the wings where the air eddies are liable to appear at the beginning of their formation, and in removing sufficient air from the upper surface through the slots 46, as is accomplished by the mechanism heretofore described, the formation of the eddies is eliminated to a great extent and is at least considerably delayed over that of conventional constructions. It will also be apparent that the means employed for withdrawing the air from the upper surface of the wings is mainly operative at such times as such withdrawal may be of advantage in the operation of the plane, and that during normal horizontal flight comparatively little resistance to flight is offered by such means.

It will be obvious, of course, that it is not essential to the present invention that the particular arrangement of ducts and fan as shown in Figs. 1, 2, 3 and 4 be employed in the practice of the present invention, but various arrangements of the same may be provided to effect the same result. For instance, the interior passageway 47 for each of the wings may be split up lengthwise of the wing into one or more separate passages, and each of the passages be provided with a fan propeller such as 70, as illustrated in Fig. 6, the fan 70 being driven through suitable gears 72 and shaft 73 from a windmill propeller 74 disposed in relative parallel relationship with respect to the general plane of the wing. In such case the windmill 74 must be placed at a sufficient distance below or above the surface of the wing so that when the angle of incidence of the wing has become great enough to endanger the plane going into a stall, the proximity of the surface of the wing will not seriously affect the relative flow of air which would otherwise have an axial component with respect to the windmill 74. In other words, the windmill, whether above or below the wing, must be at least partially outside of the zone of influence of the wing on the air.

A further modification of the present invention is shown in Fig. 6 by which the air drawn through the slot 46 is drawn through the openings 71 and is exhausted at the upper surface of the wing as in the case of the type or wing slot shown and described in my application for Letters Patent of the United States for improvements in airplane filed June 16th, 1928, and serially numbered 285,921. In this case, instead of exhausting the air directly at a point rearwardly of the wing, it is lead through passages to a supplementary spar 29, which is formed to permit the passage of air through it lengthwise of the wing, and the cover 31 is bent as indicated in Fig. 6 into spaced relationship so as to form a slot 75 adjacent the upper surface of the wing and immediately in front of the flaps or ailerons 76 which are preferably provided in such a construction. Instead of using internal wing passages to connect the slots 46 and 75, the wing itself may be sealed so that all of the air drawn through the slot 46 is exhausted through the slot 75 to the upper surface of the wing, thereby tending to carry away any eddies of air present on the upper surface and at the same time maintain that portion of the interior of the wing under a pressure greater than the existing exterior atmospheric pressure, which is desirable in those constructions employing the stressed skin principle of fabrication. Where the latter construction is employed, I prefer to provide in the passageway 47 on either side of the opening 71 and grouped around the same as shown in Fig. 7 a plurality of deflecting blades 77, which will aid in directing the air flowing along the passageway 47 into the opening 71, and I further prefer to provide similar deflecting blades 78 rearwardly of the opening 71 which serve to evenly distribute the air passing through the opening 70 throughout the length of the wing or section thereof supplied by the fan 70.

Another modification is shown in Fig. 8 in which a bracket member 80 is secured to the leading edge of the wing and projects forwardly thereof. Within the bracket 80 is journaled two shafts 81 and 82, the shaft 81 being disposed in the general plane of the wing, and the shaft 82 being disposed perpendicularly to the shaft 81 and being operatively connected thereto by the gears 83 and 84. To the lower end of the shaft 82 a propeller 85 is secured. The shaft 81 extends rearwardly through the plates 41 and 42 and is supported at its rear end in a bracket 85. The plate 42 is provided with suitable openings 87 therein and secured to the shaft 81 rearwardly of such openings is the fan 88. The action of the mechanism in this case is identical to the constructions previously described, the only difference being that the propeller 85 is positioned in advance of the wing where the desired action is aided rather than hindered by the proximity of the wing.

Figure 9:
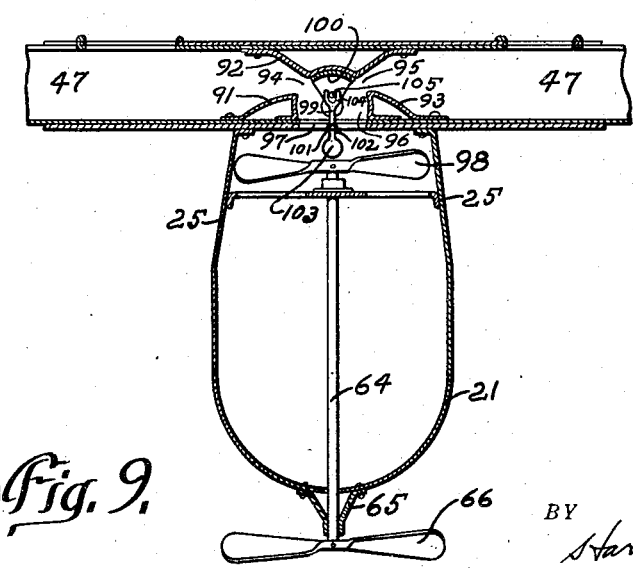
Fig. 9 is a view similar to Fig. 4 showing a modified construction for automatically limiting the effect of the air exhausting means to one of the wings only when the wing is out of lateral balance in the direction of its length.

It may be desirable in some cases that the air be drawn through the slot 46 in the wing on one side of the plane only and not through the wing on the other side thereof. Such a case may arise where the plane is improperly banked or where, for some reason or other, the wings are not in their desired horizontally disposed position. In such cases in order to restrict the action of the suction means to one side only of the plane, a construction such as is indicated in Fig. 9 may be resorted to. As shown in that figure the passageway 47 is provided at its center with three members 91, 92 and 93. The members 91 and 92 are separated to form a passageway 94 between them and the members 92 and 93 are separated to form a passageway 95 between them. The members 91 and 92 are also separated to form a passage 96 between them and the lower surface of the wing is cut away as at 97 to form a continuation of the passage 96 downwardly through the wing. The adjacent surfaces of the members 91, 92 and 93 are formed to a cylindrical shape having a common axis. In this case the propeller 66 is connected by its shaft 64 to a fan 98 secured directly to the shaft 64 below the opening 97, and the sides of the cabin 25 co-operating therewith to form a duct in which the fan 98 is positioned. Rotatably supported as at 99 on the axis of the inner surfaces of the members 91, 92 and 93 is a valve member 100, and pivotally supported at 101 below the axis of the valve and about a line parallel to the axis of the fuselage 21 is an arm 102 provided at its lower end with a weight 103 and provided at its upper end with a yoke 104 which engages a pin 105 secured to the valve 100 above its pivotal center. With this construction, as the plane moves about its longitudinal axis, the weight 103 is acted upon by a combination of gravity and centrifugal force tending to maintain the arm 102 in constant vertical position for straight flight, or at the proper angle of bank for turning flight. The result is that the yoked end of the arm moves toward whichever wing is too high, and through engagement with the pin 105 acts to move the valve 100 to close the passageway 94 or 95 depending upon which wing is too high, and thus shut off the passageway 47 in that wing to the suction of the fan 98. The weighted arm 102 co-operating through the pin 105 to move the valve is preferably employed instead of securing the weight to an arm directly secured to the valve 100, in order that a relatively greater swinging movement of the valve 100 may be obtained. The result of this construction is that during turning of the plane or any other condition, requiring lateral control, the passage of air from the upper surface of the wing through the slot 46 will be limited to the wing on the side of the plane which is too low for proper balance. This will act to give that wing a greater lifting effect than the other plane and thereby tend to stabilize the plane.

The limitation of suction to one side or the other may also be accomplished manually, preferably in combination with the operation of the other controls such as the ailerons 110 and the elevators 23. For this purpose, as illustrated in Figs. 10 to 13 inclusive, I secure to the bottom floor of the fuselage within the cabin 25 by a universal mounting 111, a conventional control stick in the form of an upwardly extending lever, or in the case of dual control, two control sticks 112, as shown in Fig. 11. The levers 112 project up through the floor 113 of the cabin which is provided with openings such as 114 to permit the universal movement of the levers 112 and are pivotally connected together by a cross link 109. Positioned outwardly of each of the levers 112 transversely of the airplane is a vertically extending shaft 116 which extends up to the roof of the cabin and is supported at its ends for rotatable movement. Each of the shafts 116 immediately above the plane of the floor 113 has non-rotatably secured thereto a radially extending arm 117 the free ends of which are pivotally connected to the adjacent lever 112 by a link 115, as indicated in Fig. 11.

As shown in Figs. 10 and 12 each of the shafts 116 has non-rotatably secured to it adjacent its upper end a radially extending arm 118 which normally extends outwardly therefrom in relation to the axis of the airplane. In longitudinal alignment with each of the arms 118 and positioned rearwardly thereof is a bell crank 119 suitably supported from the sides of the cabin 25 by means of a bracket such as 120 so as to pivot about a vertical line. The bell cranks 119 are normally positioned with one arm parallel with and extending rearwardly with respect to the axis of the airplane, and the other arm extending outwardly therefrom. The free end of the outwardly extending arm of each of the bell cranks 119 is pivotally connected to the free end of the corresponding arm 118 by a link 121.

Rotatably supported for movement about a vertical line on each wing 22 adjacent the corresponding aileron 110 is another bell crank 125 one arm of each of which is normally positioned in parallel relationship with respect to the axis of the airplane and extending forwardly from its point of pivot. The free end of each of these arms are connected by a link 126 to the free end of the rearwardly extending arm of the corresponding bell crank 119. The free end of the other arm of each of the bell cranks 125 is connected by a link such as 127 to a bracket such as 128 on the corresponding aileron 110. The levers 112 are thus connected to the ailerons 110 for controlling the movement of the same. Each of the levers 112 is connected by means of a link or rod 129 to a bracket such as 130 on the under side of the elevator 23 on the corresponding side of the airplane, the elevators 23 being preferably restrained to equal and similar pivotal movement by means of a shaft rigidly connecting the two elevators, as shown by 137 in Fig. 1. In this way the two elevators and the two control sticks are constrained to move in parallel directions.

From the above it will be apparent that if the operator grasps the upper end of one of the levers 112 and moves it forwardly as in the conventional movement of the control members for bringing the plane closer to the earth, the rear edges of the elevators will be moved downwardly and at the same time the ailerons will be moved upwardly at their rear edges. Conversely, if the upper ends of the levers 112 are moved rearwardly the elevators will be lifted at their rearward edges and the rear edges of the ailerons will be dropped. If it is desired to bank the airplane to the right, as viewed in Figs. 11 and 12, the upper ends of the levers 112 are moved to the right, causing the shafts 116 to turn in a clockwise direction as viewed in these figures. This will cause the right-hand link 121, as viewed in Fig. 12, to move rearwardly, thus causing its corresponding aileron to move upwardly, and will cause the left-hand link 121 to move forwardly and cause the corresponding aileron 110 to move downwardly, thus moving the ailerons in the proper manner to effect the desired banking. The elevators 23 will, of course, not be affected during this last operation unless the upper ends of the levers 112 are moved forwardly or rearwardly at the same time.

It will be apparent from the above that by this connection between the ailerons and the elevators, the ailerons not only may be utilized as wing flaps and employed for increasing the effective lift of the wing during those conditions when such is desired, but their function as ailerons remains. For this reason it may be preferable, in some cases, to form the entire rear edges of the wings as flaps or ailerons.

This control system is particularly adaptable for connection with the air exhausting means previously described whereby to limit the application of the air exhausting means to the side of the airplane which it is desired to raise. This may be accomplished, as indicated in Fig. 13, in which the passage 47 is provided with the same members 91, 92 and 93 as explained in connection with Fig. 9, and a valve member 100 pivoted at 99 provided as previously described. In this case, however, instead of employing the weighted lever, 102, the valve member 100 is provided with an extension 134. As indicated in Figs. 12 and 13 a coil spring 135 is connected by an adjustable member such as 136 to each side of the extension 134. The outer ends of the springs 135 are connected to the free end of the forwardly extending arm of the corresponding bell crank 119 on its side of the plane. By this construction, if the control levers 112 are moved either forwardly or rearwardly to change the elevation of the airplane, the bell cranks 119 will rotate simultaneously in opposite directions and the springs 135 will be either equally expanded or contracted so that the position of the valve 100 will remain unchanged. However, when the upper ends of the control sticks 112 are moved either toward the left or right to bank the airplane, the bell cranks 119 will rotate simultaneously in the same direction, and the springs 135 will be bodily moved in the opposite direction to that of the control sticks, the latter depending upon the direction of the intended bank. When this occurs the extension 134 with its member 136 will move accordingly, thus imparting movement to the valve member 100 so as to shut off that portion of the passage 47 on the side of the airplane which it is desired to lower and consequently limiting the action of the air exhausting means to that portion of the passage 47 on the side of the airplane which it is desired to raise. The action of the valve 100 in such a case is therefore automatically controlled through the levers 112 in parallel with the operation of the ailerons 110.

It is apparent that although I have described this control mechanism for the flaps and elevators in combination with the control of the suction means on the wings, this latter feature may be eliminated without affecting the otherwise effectiveness of the aileron and elevator control, and such control is not to be construed as thus limited in its scope.

There is a disadvantage in using ailerons for flaps, namely that when they are turned down to a large positive angle for flap purposes, they become less effective as ailerons for lateral control. Thus, in many cases, it may be desirable to use entirely separate aileron surfaces, preferably placed out toward the wing tips. Most effective control under all conditions would then be maintained by reversing the previously described movement of the ailerons relative to the elevator. For example, when the elevator is raised, putting the airplane at a larger angle of incidence, the ailerons instead of being lowered would be raised. This tends to maintain the original or neutral angle of incidence of the ailerons, keeping them at their maximum effectiveness for lateral control, their differential action for side movements of the control stick being the same as previously described. The rearrangement of arms 117 and links 115 for this case is shown in Fig. 12—A (Sheet 5 of the drawings). If flaps 166 are used in this case, their brackets 167 are preferably directly connected by links such as 168 to elevator rods 129 so that the flaps will move together but opposite to the movement of the elevator. The suction control in this case must have a reverse action from that previously described, a simple reversing lever being sufficient for the purpose.

It is also evident that the suction control valves may be connected in such a way as to function with a change of elevator position instead of with a differential aileron movement, or the two effects may be combined.

In Fig. 14 I show a modified control for operating the movable wing surfaces as either flaps or ailerons, and for controlling the elevator surface or surfaces. In this construction a single control lever 140 is employed instead of the two levers shown in the above mentioned construction. As indicated in Fig. 14, a pair of supporting members 141 are secured to the floor 142 of the fuselage or to any other suitable supporting surface, and extending between the supports 141 is a member whose end surfaces 143 are trunnioned in the supports 141 and which member is provided with a pair of spaced upwardly extending arms 144. The lever 140 is pivoted between its ends as at 145 between the arms 144. The lower end of the lever 140 is pivotally connected by means of the link 146 to the axially shiftable and rotatable shaft 147 which extends rearwardly therefrom and may be supported at its rear end by a supporting member such as 148. It will be obvious that if the lever 140 is rocked laterally it will cause the member in which it is supported to rotate in the supports 141 and cause a corresponding rotation of the shaft 147. Furthermore, if the upper end of the lever 140 is shifted either forwardly or rearwardly it will pivot about the pivot point 145 and will cause the shaft 147 to slide either rearwardly or forwardly. This double movement of the shaft 147 is taken advantage of to permit the required control of the movable wing surfaces 149 and the elevator surface 150 in the following manner.

The shaft 147 has secured thereto rearwardly of the rear support 141 an upwardly extending bracket 151 to the upper ends of which are pivotally secured two arms 152 which extend rearwardly and outwardly therefrom. The outer ends of the arms 152 are pivotally connected to the free ends of the arms 153 and are constrained for pivotal movement about the pivot point 154. A rod 155 pivotally connects the free end of each of the arms 153 with the forwardly extending arm of the corresponding bell crank 156 secured for pivotal movement about the pin 157 carried by the corresponding wing 158. The inwardly extending arm of each bell crank 156 is pivotally connected through the rod 159 to the top horn 160 on the corresponding movable control surface 149 which is, of course, pivotally connected at its forward edge to its corresponding wing 158. The rear end of the shaft 147 which projects rearwardly from the support 148 is connected by a ball joint 161 and rod 162 to the top horn 163 on the elevator surface 150. A pair of springs 164 having a turn buckle 165 interposed between them to adjust their tension are preferably extended between the free ends of the arms or levers 153 so as to constantly urge such free ends of the arms toward each other.

The operation of the above will be readily apparent. If it is desired to bank the plane for a left-hand turn the upper end of the lever 140 is moved to the left which rotates the shaft 147. This rotation of the shaft 147 acting thru the rods 152 moves both of the rods 155 to the left and this movement of the rods 155 acting thru the bell cranks 156 causes the left-hand movable wing surface 149 to swing upwardly and the right-hand surface 149 to swing downwardly, thus moving these surfaces in the correct direction for such banking. It will be noted that during this movement, and assuming that the upper end of the lever 140 is not shifted longitudinally of the airplane, the position of the elevator 150 will not be changed.

If the upper end of the lever 140 is moved forwardly in order to direct the nose of the airplane downwardly, the shaft 147 will be moved rearwardly and this movement in being transmitted thru the rod 162 to the elevator will swing the elevator downwardly. At the same time the bracket 151 is moved rearwardly with the shaft 147 and this movement of the bracket 151 acting thru the rods 152 causes both of the rods 155 to move outwardly, and acting thru the bell cranks 156, to swing both of the surfaces 149 in the same direction upwardly. Conversely, if the upper end of the lever 140 is moved rearwardly, the elevator 150 will swing upwardly and the control surfaces 149 swing downwardly.

Thus with the single control member 140 the control surfaces 149 may be operated simply as ailerons without affecting the elevator 150, or it may be moved so that the control surfaces 149 are moved simultaneously in the same direction to act as wing flaps in conjunction with simultaneous opposed movement of the elevator 150. It will also be apparent that with this form of control mechanism, the valvular means previously discussed in connection with the dual form of control for controlling the effect of the suction producing means on the wing slots may be equally well connected up in this construction so as to properly control the same through the medium of a reversing lever, and inasmuch as such hook-up is obvious I deem it unnecessary to show it.

It will be obvious, of course, that various changes may be made in the specific embodiments of the present invention disclosed in the drawings and described in the specification without departing from the spirit or substance of the broad invention, the scope of which is commensurate with the appended claims.

What I claim is:

1. In an airplane, in combination with a wing thereof having an opening in its upper surface, means for drawing air through said opening, and rotor means substantially out of the zone of influence of the wing with its axis of rotation substantially perpendicular to the plane of said wing, operable by a relative flow of air angularly with respect to the plane of said wing for driving the first mentioned means.

2. In an airplane, in combination with a wing thereof having an opening in its upper surface, a duct within said wing communicating with said opening, means for exhausting air from said opening, and rotor means exterior of the wing and spaced vertically therefrom by a distance equal to at least half the chord of said wing, and positioned with its plane of rotation substantially parallel to the general plane of said wing, for driving the first mentioned means operated by a relative flow of air toward said wing at an angle to the general plane of said wing.

3. In an airplane, in combination with a wing thereof having an opening in its upper surface, a duct within said wing communicating with said opening, means for exhausting air from said opening, and means exterior of the wing comprising a wind driven rotor for driving the first mentioned means and operable only when the angle of incidence of said wing becomes relatively large and substantially independent of the air pressure distribution about said wing.

4. In an airplane, in combination with a wing thereof having an opening in its upper surface, a duct within said wing connected with said opening, a fan in said duct for exhausting air therefrom, and means for driving said fan comprising an air driven element exteriorly of said wing and spaced vertically therefrom by a distance equal to at least half the chord of said wing and disposed with its axis substantially perpendicular to the general plane of said wing and operatively connected to said fan.

5. In an airplane, in combination with a wing thereof having an opening in its upper surface, a duct within said wing connected with said opening, a fan in said duct for exhausting air therefrom, and means for driving said fan comprising a windmill supported below said wing and spaced therefrom by at least half the chord of said wing and not more than one and one-half the chord of said wing, to rotate in generally parallel relationship with respect to the general plane of said wing and operatively connected to said fan.

6. In an airplane, in combination with a wing thereof having an opening in its upper surface, a duct within said wing connected with said opening, a fan in said duct for exhausting air therefrom, and means for driving said fan comprising a windmill supported to rotate in generally parallel relationship with respect to the general plane of said wing, said propeller being positioned substantially outside of the zone of influence of said wing on the surrounding air, and being operatively connected to said fan for imparting driving movement thereto.

7. In an airplane, in combination, a wing extending from each side thereof, a duct formed lengthwise of said wing, said wings being provided with openings in the upper surfaces thereof leading into said duct, means for exhausting air from said duct whereby to suck the boundary layer of air from the upper surface of said wing through said openings, and means for limiting the effect of the first mentioned means to the wing on the side of said airplane which happens to be too low whether in straight flight or in a banked turn.

8. In an airplane, in combination, a wing extending from each side thereof, a duct extending lengthwise of said wings, said wings being provided with openings in their upper surfaces leading into said duct, means for withdrawing air from said duct whereby to remove the boundary layer of air from the upper surface of said wings, and automatically actuated means for throttling the withdrawal of air from said duct on the side of the airplane which is too high.

9. In an airplane, in combination, a wing extending from each side thereof, a duct extending lengthwise of said wings, said wings being provided with an opening leading into said duct, means for exhausting air from said duct whereby to remove the boundary layer of air from the upper surface of said wings, a valve between said duct and said means, and means for automatically moving said valve to shut off that portion of said duct on the high side of said airplane from the first mentioned means when said airplane is tipped laterally.

10. In an airplane, in combination, a wing extending from each side thereof, a duct extending lengthwise of said wings, said wings being provided with an opening leading into said duct whereby to remove the boundary layer of air from the upper surface of said wings, a valve between said duct and said means, and gravity actuated means for automatically moving said valve to throttle that portion of said duct on the side of said airplane which is too high.

11. In an airplane, in combination, a wing extending outwardly from each side thereof, an aileron on each of said wings, a manually controllable member operatively connected to said ailerons for controlling the position thereof, said wings being provided with openings in their upper surfaces, a duct within said wings connected with said openings, means for exhausting air from said duct, valvular means co-operating with said duct for shutting off the first mentioned duct from communication with the duct in either of the wings, and a connection between said valvular means and said manually controllable member whereby said valvular means and said ailerons are simultaneously controlled.

12. In an airplane, in combination, a wing extending outwardly from each side thereof, a control surface carried by each of said wings to pivot about a line substantially parallel to the length of said wings, a manually actuable control member, means connecting said member and said surfaces whereby said control surfaces may be moved simultaneously in the same direction or in opposite directions at will, said wings being provided with openings in their upper surfaces, a duct in said wings in communication with said openings, means for exhausting air from said duct, valvular means operable to close communication between said exhausting means and that portion of said duct in either of said wings, and means connecting said valvular means and said means connecting said surfaces and said control member operable to move said valvular means when said surfaces are simultaneously moved in opposite directions.

13. In an airplane, in combination, a wing extending outwardly from each side thereof, a control surface carried by each of said wings to pivot about a line parallel to the length of said wings, a pair of spaced connected levers supported at their lower ends for universal movement, a rotatable shaft positioned outwardly of each of said levers, and in substantial transverse alignment therewith, an arm non-rotatably secured to each of said shafts, a link connecting each of said arms with the corresponding of said levers, a second arm secured to each of said shafts and extending in opposite directions with relation to each other, and linkages including corresponding bell cranks positioned in opposed relationship connecting said second arms with said control surface.

14. In an airplane, in combination, an elevator, a pair of flaps, a pair of ailerons, an actuating lever connected with said ailerons, whereby said ailerons may be moved either differentially or similarly, and a connection between said lever and said elevator and flaps whereby when said lever is actuated to move said ailerons differentially said elevator and flaps remain unchanged in position, and when said lever is actuated to move said ailerons similarly said elevator is moved simultaneously therewith in the same direction and said flaps are moved in a direction opposite to the direction of aileron movement.

15. In an airplane, in combination, a pair of ailerons, a bracket supported for rotatable movement and fixed against axial movement, a lever pivoted to said bracket for movement in a plane approximately parallel to the axis of rotation of said bracket, an axially shiftable and rotatable shaft axially aligned with said bracket, means connecting said shaft and said lever whereby said shaft may be moved axially by said lever and may be rotated with said bracket, and a second bracket fixed to said shaft eccentrically connected to said ailerons whereby rocking of said shaft will cause differential movement of said ailerons and axial movement of said shaft will cause like movement of said ailerons.

16. In an airplane, in combination, an elevator, a pair of ailerons, a bracket supported for rotatable movement and fixed against axial movement, a lever pivoted to said bracket for movement in a plane approximately parallel to the axis of rotation of said bracket, an axially shiftable and rotatable shaft axially aligned with said bracket, means connecting said shaft and said lever whereby said shaft may be moved axially by said lever and may be rotated with said bracket, a second bracket fixed to said shaft eccentrically connected to said ailerons whereby rocking of said shaft will cause differential movement of said ailerons and axial movement of said shaft will cause like movement of said ailerons, and a swiveled connection between said shaft and said elevator whereby to cause movement of said elevator simultaneously with said like movement of said ailerons.

17. In an airplane, in combination, an elevator, a pair of ailerons, a bracket supported for rotatable movement and fixed against axial movement, a lever pivoted to said bracket for movement in a plane approximately parallel to the axis of rotation of said bracket, an axially shiftable and rotatable shaft axially aligned with said bracket, means connecting said shaft and said lever whereby said shaft may be moved axially by said lever and may be rotated with said bracket, a second bracket fixed to said shaft eccentrically connected to said ailerons through oppositely disposed bell cranks on opposite sides of said second bracket, whereby rocking of said shaft will cause differential movement of said ailerons and axial movement of said shaft will cause like movement of said ailerons, and a swiveled connection between said shaft and said elevator whereby to cause movement of said elevator simultaneously with said like movement of said ailerons.

18. In an airplane, in combination, a pair of ailerons, a pair of wing flaps, a control member, means including bell cranks oppositely disposed on opposite sides of said airplane connecting said control member with said ailerons whereby movement of said control member in one direction causes like movement of said ailerons and movement of said control member in another direction causes differential movement of said ailerons, and means connecting said control member and said flaps whereby said flaps are caused to move in a like sense simultaneously with said ailerons when said ailerons are moved in a like sense and remain substantially stationary when said ailerons move differentially.

19. In an airplane, in combination, a pair of ailerons, a pair of wing flaps, an elevator, a control member, means including bell cranks oppositely disposed on opposite sides of said airplane connecting said control member with said ailerons whereby movement of said control member in one direction causes like movement of said ailerons and movement of said control member in another direction causes differential movement of said ailerons, and means connecting said control member and said flaps and elevator whereby said flaps are caused to move in a like sense simultaneously with said ailerons when said ailerons are moved in a like sense and remain substantially stationary when said ailerons move differentially, and said elevator is moved simultaneously with said flaps.

20. In an airplane, in combination with a wing thereof having an opening in its upper surface, air pumping means for drawing air into said wing through said opening, and means for driving said pumping means including a wind driven rotor supported out of vertical alignment with said wing and substantially out of the zone of influence thereof and with the axis thereof approximately perpendicular to the general plane of said wing, and means operatively connecting said rotor and said pumping means.

21. In an airplane, in combination with a wing thereof having an opening in its upper surface, air pumping means for drawing air into said wing through said opening, and means for driving said pumping means including a wind driven rotor supported in advance of said wing and with its plane of rotation substantially parallel to the general plane of said wing, and a driving connection between said rotor and said pumping means.

RALPH H. UPSON.